US008640093B1

(12) United States Patent
Gill et al.

(10) Patent No.: US 8,640,093 B1
(45) Date of Patent: Jan. 28, 2014

(54) NATIVE WEB SERVER FOR CROSS-PLATFORM MOBILE APPS

(75) Inventors: Sunbir Gill, Irvine, CA (US); Matthew A. Jones, Ladera Ranch, CA (US); Ameesh Paleja, Irvine, CA (US)

(73) Assignee: Amazon Technologies, Inc., Reno, NV (US)

( * ) Notice: Subject to any disclaimer, the term of this patent is extended or adjusted under 35 U.S.C. 154(b) by 62 days.

(21) Appl. No.: 13/168,887

(22) Filed: Jun. 24, 2011

(51) Int. Cl.
*G06F 9/44* (2006.01)

(52) U.S. Cl.
USPC .......................................... 717/120; 717/121

(58) Field of Classification Search
None
See application file for complete search history.

(56) References Cited

U.S. PATENT DOCUMENTS

| | | | | |
|---|---|---|---|---|
| 2004/0255005 | A1* | 12/2004 | Spooner | 709/218 |
| 2006/0020688 | A1* | 1/2006 | Chang et al. | 709/219 |
| 2007/0073650 | A1 | 3/2007 | Lueck | |
| 2007/0099659 | A1 | 5/2007 | Borquez et al. | |
| 2007/0100648 | A1* | 5/2007 | Borquez et al. | 705/1 |
| 2008/0263103 | A1* | 10/2008 | McGregor et al. | 707/200 |
| 2009/0234861 | A1 | 9/2009 | Ramer et al. | |
| 2009/0241135 | A1* | 9/2009 | Wong et al. | 719/328 |
| 2009/0271783 | A1* | 10/2009 | Hsieh et al. | 717/178 |
| 2010/0262677 | A1* | 10/2010 | Mergi et al. | 709/219 |
| 2010/0287048 | A1* | 11/2010 | Ramer et al. | 705/14.46 |
| 2011/0010705 | A1* | 1/2011 | Adams et al. | 717/178 |
| 2011/0078678 | A1* | 3/2011 | Matthews | 717/178 |
| 2011/0161912 | A1* | 6/2011 | Eteminan et al. | 717/101 |
| 2011/0289496 | A1* | 11/2011 | Steer | 717/169 |
| 2012/0040321 | A1* | 2/2012 | Cork et al. | 434/262 |
| 2012/0198437 | A1* | 8/2012 | Kotamarthi et al. | 717/174 |
| 2012/0236201 | A1* | 9/2012 | Larsen et al. | 348/468 |
| 2012/0246114 | A1* | 9/2012 | Edmiston et al. | 707/625 |
| 2012/0266068 | A1* | 10/2012 | Ryman et al. | 715/719 |

* cited by examiner

*Primary Examiner* — Don Wong
*Assistant Examiner* — Hossain Morshed
(74) *Attorney, Agent, or Firm* — Knobbe, Martens, Olson & Bear, LLP

(57) ABSTRACT

Hosted applications are developed to be run in a hosted network environment and with access to host resources such as server databases and messaging systems. The host applications may include tag based requests for host resources. A platform-specific native host is used on a mobile device which interacts with a hosted application and identifies content-based request for host resources. The native host then determines and performs appropriate functionality in the context of a mobile platform to satisfy the host resource request. Hosted applications may thereby be run natively on mobile devices of various mobile platforms and accessed even when the mobile devices lack network connections.

21 Claims, 13 Drawing Sheets

GENERIC CONTENT APPLICATION  /— 101

```
...
<body>  ⟩ 210
...
    Let's take a picture!  211  212   /— 213
    <button type="button" title="Camera">
        <genericTag> —— 214
            <showCamera/> —— 215
        </genericTag>
    </button>      216
                217
</body>   ⟩ 218
...
```

PLATFORM A FUNCTIONAL LIBRARY  /— 153

```
...
showCamera —— 230
    imports: android.app.Activity       ⟩ 231
             android.os.Bundle
    function: setContentView(savedInstanceState);
              CameraSurfaceView cam = new CameraSurfaceView(this);   } 232
              cam.surfaceCreated(null);
...
```

PLATFORM B FUNCTIONAL LIBRARY  /— 163

```
...
showCamera —— 250
    imports: cameraViewController.h —— 251
    function: UIImagePickerController *picker = [[UIImagePickerController alloc] init];
              picker.sourceType = sourceType;
              picker.delegate = self;                                            ⟩ 252
              if (sourceType == UIImagePickerControllerSourceTypeCamera)
                  [self presentModalViewController:picker animated:YES];
...
```

*Fig. 2.*

HOSTED APPLICATION    1140

```
...                                                                    1201
<title title="Warehouse Inventory Hosted App" underline="true" />
              1202      1204         1205                              1206
Blue Widgets
  1203  In Stock: <hostTag> <serverGetDBEntry entry="blueWidgetStock"/></hostTag>
  1207  On Order: <hostTag> <serverGetDBEntry entry="blueWidgetOnOrder"/></hostTag>
  1209   <button title="Update Inventory">— 1210                      1208
              <hostTag> <serverSetDBEntry entry="blueWidgetStock"/></hostTag>
          </button>                                                   1211
  1212  ┌ <button title="Order 10">
         │     <hostTag> <serverFwdMessage message="10BlueWidgetOrder"
         │                                 recipient="WidgetCo"/>
         │     </hostTag>
         └ </button>
                       1232
Orange Widgets
        ┌ In Stock: <hostTag> <serverGetDBEntry entry="orangeWidgetStock"/></hostTag>
        │ On Order: <hostTag> <serverGetDBEntry entry="orangeWidgetOnOrder"/></hostTag>
        │ <button title ="Update Inventory"
        │     <hostTag> <serverSetDBEntry entry="orangeWidgetStock"/></hostTag>
  1233 ─│ </button>
        │ <button title="Order 10">
        │     <hostTag> <serverFwdMessage message="10OrangeWidgetOrder"
        │                                 recipient="WidgetCo"/>
        │     </hostTag>
        └ </button>
...
```

PLATFORM A FUNCTIONAL LIBRARY    1151

```
...
SQLiteDatabase db;   1261
QueuedMessageHandler msgHandler  1262
...
                                     1263
serverGetDBEntry(Entry entryToGet)
      return db.getEntry(entryToGet);
                                    1264
                                  1265
serverSetDBEntry(Entry entryToSet)
      return db.setEntry(entryToSet);
                                   1266
                                                                          1267
serverForwardMessage(Message messageToForward, Recipient messageRecipient)
      return msgHandler.forwardMessage(messageRecipient, messageToForward);
...                                                                       1268
```

*Fig.12.*

NATIVE WEB SERVER FOR CROSS-PLATFORM MOBILE APPS

BACKGROUND

Applications created for mobile devices form a growing industry. Individuals, corporations, and other entities are creating an increasing number and variety of mobile applications. Often, a particular version of a mobile application will only work on mobile devices using the specific mobile device platform for which the mobile application was developed. However, there are a number of popular mobile device platforms. This can pose a number of problems to mobile application developer. A developer may limit development of a mobile application to only a subset of mobile device platforms, thereby limiting the number of potential users and/or customers. Should the developer wish to expand the number of mobile platforms on which a mobile application may be used, the developer may need to expend additional resources to create new versions for the additional mobile platforms. Supporting multiple versions, each released for a separate mobile platform, can add cost, stress and delay to the software support lifecycle. Also, the ability to create and support different versions of a mobile application for different mobile platforms may require that a developer learns about and stays current on differing implementation details for the various mobile platforms. Faced with this variety of platform-specific implementation details, a developer may inadvertently introduce bugs into the mobile applications.

Advances in modern software development have allowed for a limited degree of cross-platform mobile application development, but many shortcomings still exist. For example, a developer may be able to reuse some portions of a mobile application created for one platform when creating a version of that mobile application for a different platform. However, portions of that mobile application which interact with certain mobile device resources may need to be rewritten for the different platform. These mobile device resources may include the hardware or related software (e.g., a driver) of the mobile device, such as a camera, a global positioning satellite ("GPS") receiver, an accelerometer, a gyroscope, a communications radio, a user input receiver (e.g., multi-touch user input), file management and data storage. Using existing software development tools and techniques, portions of a mobile application which interact with such mobile device resources may need to be implemented separately for different mobile device platform.

Additionally, there are many software developers whose experience and knowledge is focused on development of applications designed to operate in a network hosted environment. Some of these developers may be unfamiliar with mobile application development but may nonetheless wish to create mobile applications. However, knowledge of hosted application development may not be entirely sufficient for the creation of a mobile application. For example, a developer accustomed to creating hosted applications may expect certain host resources to be available to an application. Examples of these host resources may host-based storage, a database service, a message forwarding service, and a reply/request interface. As one or more of these host-based resources may be unavailable mobile applications running on certain mobile platforms, such a developer may face a challenge of unfamiliar development constraints when creating a mobile application. Or, a developer may simply prefer to develop applications which have access to host resources. Alternatively or additionally, a developer may wish create a mobile application with access to host resources which typically require a network connection to access, but may also want the mobile application to have access to those host resources even when it lacks a network connection.

Furthermore, there are a number of network resources which may be useful for a mobile application to access. Examples of such network resources include electronic catalogues and the items which they contain, metric data, and advertisements. To the extent that a network resource can be accessed by a mobile device, there may be one or more restrictions which complicate such access. For example, an implementation for accessing such a network resource may require a significant amount of work to establish a connection, authenticate, and request the network resource. This may need to be implemented in a format specific to the particular network resource. For example, one electronic catalog may have an application programming interface ("API") which allows a mobile device to access the electronic catalog's contents using uniquely formatted queries and/or parameters. Another electronic catalog may have a separate API which requires the use of differently formatted queries and/or parameters. A mobile application developer may need to be familiar with this variety of API's in order to create a mobile application capable of accessing the various electronic catalogues.

Some network resource requests may require complex implementations beyond what can currently be accessed through the content of a mobile application. For example, a developer may need to use a non-content-based implementation to access a network resource, when that developer would be more easily able to create content-based applications. As another example, a party exercising control over a network resource may change the format required to interact with the network resource. This may cause existing versions of mobile applications which could previously access the network resource to no longer be capable of accessing the network resource.

BRIEF DESCRIPTION OF THE DRAWINGS

The accompanying drawings, which are incorporated in and form a part of this specification, illustrate example embodiments of the inventive subject matter, and in no way limit the scope of protection. The accompanying drawings include examples of possible graphical user interfaces for use with the disclosed system and methods. Other embodiments are contemplated using alternate hardware and/or software platforms, and using significantly different interfaces. The accompanying drawings illustrate embodiments wherein:

FIG. 2 is an example of a portion of a generic content application and corresponding portions of two platform-specific functional libraries.

FIG. 12 is an example of a portion of a hosted application including network resource references and a corresponding function library including mobile device resource references and associations between those mobile device resource references and the network resource references.

DETAILED DESCRIPTION OF SPECIFIC EMBODIMENTS

Mobile Device Resource References

Figure 1:
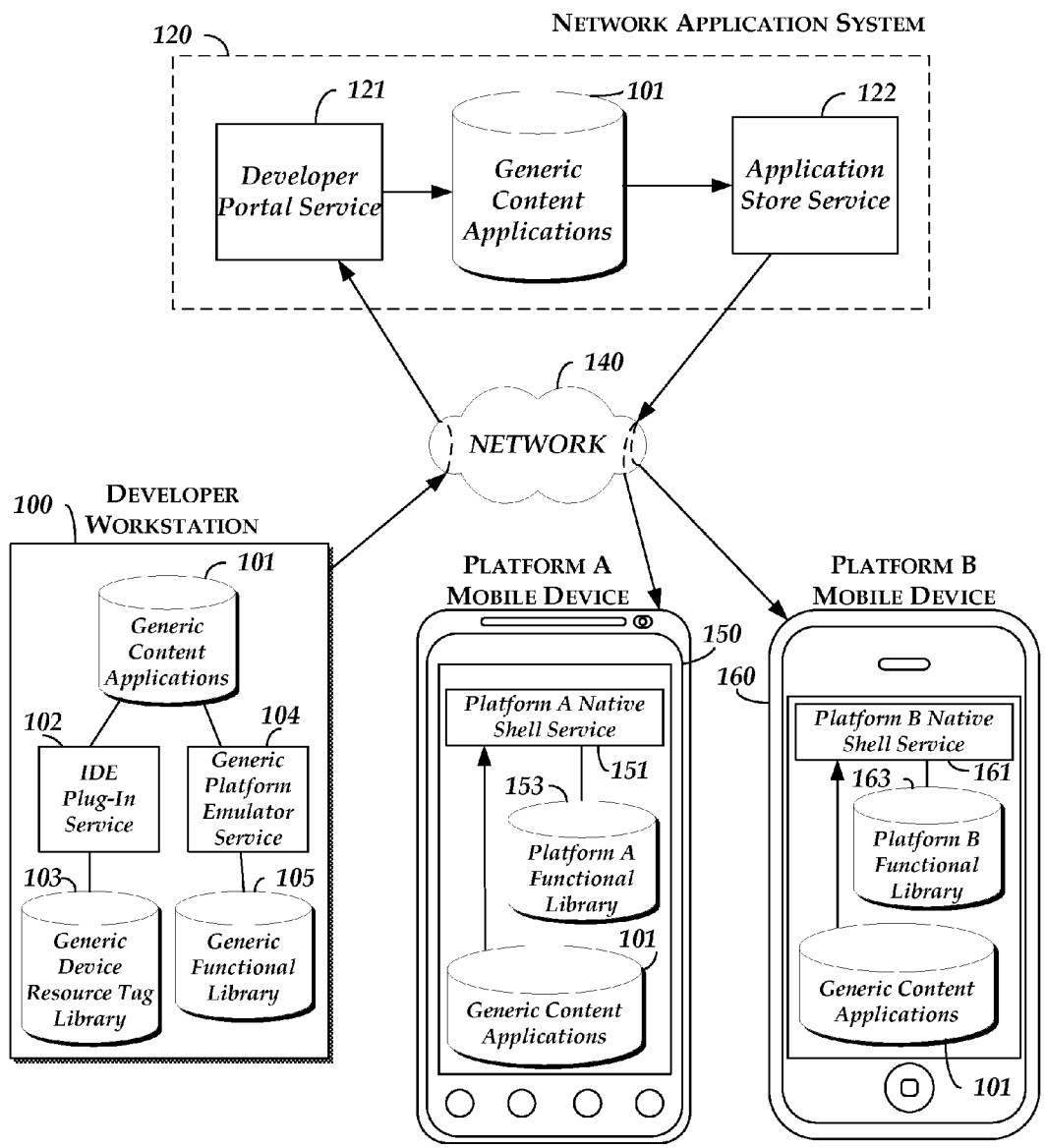
FIG. 1 depicts one embodiment of a system for the distribution of cross-platform mobile applications.

FIG. 1 shows one embodiment of a system for using cross-platform, content-based mobile applications on mobile devices. For example, a developer may seek to create a single version of a mobile application which can run on both Google's Android mobile operating system and Apple's iOS mobile operating system. Each of these operating system provides limited support for cross-platform functionality. For example, each operating system supports HyperText Markup Language 5 ("HTML5"), so functionality accessible through HTML5 can be used natively on either operating system. However, in the present example the developer wants to create a mobile application which can be run on either an Android device or an iOS device, and can access the camera of whatever device it is run on. Android and iOS require applications to use different, platform-specific implementations in order to access a device's camera. Accordingly, the developer would typically need to create one version of the application for Android and a separate version for iOS. The present embodiment allows the developer to create a single version of the mobile application which can access the camera on either an Android mobile device or an iOS mobile device.

To create the single version of the application in this example, the developer creates a generic content application 101 which includes a generic device resource tag found in a generic device resource tag library 103. For example, the generic device resource tag library may indicate that, within the context of this system, the generic <camera> tag can be used to access the camera of a mobile device. The developer includes the <camera> tag within the generic content application 101 while creating the generic content application 101. Once the generic content application is complete, the developer submits it to a network application system 120.

The user of an Android mobile device 150 downloads the generic content application 101 from the network application system 120. The user of an iOS mobile device 160 also downloads the generic content application 101 from the network application system 120. The network application system 120 also provides each user with a native shell service specific to their mobile device's operating system. When the Android device runs the generic content application 101, the platform A native shell service 151 recognizes the <camera> tag as a mobile device resource reference requiring platform-specific access and provides the appropriate access to the Android mobile device's camera. The mobile device resource reference may be associated with a mobile device resource request. Similarly, when the iOS device runs the generic content application 101, the platform B native shell service 161 recognizes the <camera> tag as a mobile device resource reference requiring platform-specific access and provides the appropriate access to the iOS mobile device's camera.

Developer Workstation

The components illustrated within the present embodiment will next be described in greater detail to further illustrate how the embodiment provides cross-platform access to platform-specific mobile device resources. A developer may use a developer workstation 100 to create one or more generic content applications 101. The developer workstation may, for example, be a desktop or laptop computer. In the present embodiment, the developer may store one or more copies, including the work-in-progress copy, of a generic content application 101 on the developer workstation 100. In other embodiments, one or more copies are stored external to the developer workstation 100. It will be understood that the numbering "101" used to identify the generic content application(s) 101 indicates the generic content application(s) itself or themselves, rather than a storage medium used to store the generic content application(s). For example, as illustrated in FIG. 1, the same generic content application may be stored on a developer workstation 100, on a network application system 120, and on mobile devices 150, 160. A device or service storing one or more generic content applications 101 need not store each generic content application 101 which other devices and services store.

A developer may reference a generic device resource tag library 103, for example in order to review a list of available generic device resource tags, identify a mobile device resource tag associated with a mobile device resource reference which the developer wishes to include in a generic content application 101, and/or to reference the proper syntax, format, or other use of the generic device resource tag. In one embodiment, the generic device resource tag library 103 is a text-based file, such as an XML or HTML file, including information about generic device resource tags. In another embodiment the generic device resource tag library 103 located external to the developer workstation 100, for example being accessible by the developer through a network 140 such as the Internet. In another embodiment, a developer may also create generic content applications 101 without use of a generic device resource tag library 103, since the generic device resource tag library 103 is an optional reference tool for the developer.

A developer may use an integrated development environment ("IDE"), such as Eclipse or Visual Studio, to develop generic content applications 101. The system may include an IDE plug-in service 102 which accesses the generic device resource tag library 103 in order to make the information contained therein more accessible to the developer while the developer is working with the IDE. For example, the IDE plug-in service may present a frame within the IDE where generic device resource tags are shown and described. The IDE and/or the IDE plug-in service may, in some embodiments, be used to create generic content applications 101.

In the embodiment of FIG. 1, a content application may be an application comprising one or more content-based files. A content-based file may lack any portions which are directly computer-executable (e.g., binary software). Such content may, for example, be in the form of a markup language such as HTML5, some other version of HTML, XHTML, Extensible Markup Language (XML), Cascading Style Sheets (CSS), and/or any combination thereof. In one embodiment, a content-based application may include one or more files which are at least in part, non-content-based. In another embodiment, a content application consists solely of files which are entirely content-based. The generic nature of a generic content application 101 relates to the use of generic content, such as content which is not created for a particular platform. The above-described application using the <camera> generic device resource tag is an example of a generic content based application. In another embodiment, a generic content-based application may include both platform-specific and generic content, and may further require the use of a platform-specific native shell in order for a mobile device to use the generic content contained within the generic content-based application.

A generic content application 101 may include a generic device resource tag so that the application, when used on a mobile device 150, 160, may have access to a device resource of that mobile device 150, 160. For example, the device resource tag may be considered generic because, at the time the generic device resource tag is included by the developer within the generic content application 101, the generic device resource tag is not associated with any particular instance of platform of the device resource to which it relates. The <camera> tag, for example, could be used at runtime to access an iOS device's camera, an Android device's camera, or some other device's camera.

Examples of mobile device resources may include, for example, a mobile device's hardware or related software (e.g., a driver), such as a camera, a global positioning satellite ("GPS") receiver, an accelerometer, a gyroscope, a communications radio, a user input receiver (e.g., multi-touch user input), file management and/or data storage.

As the generic content applications described in this embodiment may include mobile device resource references which are not specific to any particular instance or platform, the system may also include a generic platform emulator 104 which provides a developer with the ability to use a generic content application 101 on the developer workstation 100. For example, the developer workstation 100 may not include a camera, but the developer may wish to test a mobile application which includes a mobile device resource reference for a camera. The generic platform emulator service 104 may emulate the behavior of a mobile device by emulating access to a mobile device resource in response to identifying a generic device resource tag. An emulated camera user interface may be presented in response to the generic platform emulator service 104 identifying the <camera> generic device resource tag, which may be interpreted as a reference to access a mobile device camera resource. In one embodiment, the generic platform emulator service 104 emulates the behavior of an imagined or abstract mobile device running the generic content application.

In another embodiment, one or more generic platform emulator services may be used, at least some of which may emulate the behavior of specific mobile platforms in running the generic content application. A developer may thereby be able to test how the generic content application is expected to run on, for example, an iOS device, and on an Android device. The generic platform emulator service 104 may access a generic functional library 105 which provides emulated and/or generic functional behavior associated with mobile device resource references.

As another example, a generic content application 101 may include a mobile device resource reference to a latitude and longitude position from a GPS receiver. A developer may use a generic platform emulator service 104 to test the generic content application 101. When the portion of the mobile application dealing with the GPS receiver reference and/or its associated request is reached (for example because the generic platform emulator service is executing associated content from the generic content application 101), the generic platform emulator service 104 accesses the generic functional library 105 in order to determine the generic function to provide in response to the mobile device resource reference to the GPS receiver. One such generic function response could be providing a fixed latitude and longitude pair. A more complex generic function response would be to show present the developer with a user input prompt to enter the latitude and longitude pair which the generic platform emulator service will treat as the response from a mobile device resource.

Network Application System

The present embodiment further includes a network application system 120. The network application system may consist of one or more servers or services, including ones which are distributed and/or cloud-based. The network application system 120 may be in communication with a developer workstation 100 and/or a mobile device 150 through a network 140, such as the Internet. The network application system 120 includes a developer portal service 121 through which the network application system 120 receives generic content applications from developers. For example, the developer portal service 121 may be a portal accessible through an electronic resource, such as a webpage, and may allow a developer to upload a generic content application 101, such as by specifying the file or files associated with the generic content application 101 using a web-browser on the developer workstation 100. In another embodiment, the developer portal service 121 may include a file transfer protocol ("FTP") server. The developer portal service may transmit the received generic content applications 101 for storage associated with the network application system 120. For example, the network application system may include a data store of generic content applications submitted by a number of developers.

The network application system may also include an application store service 122, which provides one or more generic content applications stored by, or accessible to the network application system, to mobile device users. For example, the application store service 122 may access an electronic catalog of mobile device applications and may allow users to access the electronic catalog using a web-browser to access the application store service 122. In another embodiment, the application store service 122 may be configured to provide data to some other software, such as a mobile device application configured to interact with the application store service 122.

Mobile Device

The embodiment of FIG. 1 includes mobile devices, one mobile device 150 identified as using platform A, and the other mobile device 160 identified as using platform B. In the illustrated embodiment, these mobile devices are smartphones, examples of which include HTC's EVO, Apple's iPhone, Research In Motion's Blackberry Torch, and Motorola's Atrix. Other devices and types of devices may also be used, for example tablet computing devices (e.g., HTC's Flyer, Apple's iPad, Research In Motion's Blackberry Playbook), personal data assistants, netbooks (e.g., Samsung's Chromebook, HP's HP Mini, Asus's Eee PC), laptops, and personal computers. Each mobile device may use one or more mobile device operating systems as a platform. Examples of these mobile platforms include Google's Android, Apple's iOS, Microsoft's Windows Phone, Nokia's Symbian, HP's PalmOS, Google's Chrome OS, or Research In Motion's BlackBerry OS. Other operating systems may be used, such as Apple's OS X, Microsoft's Windows, Linux, etc. In another embodiment, different versions of a platform are treated as separate platforms, for example because those different versions may require version-specific implementations related to accessing certain mobile device resources.

In the present embodiment, mobile devices 150, 160 store generic content applications 101. For example, a generic content application's content files may be stored in a mobile device's memory, such as on persistent, flash-based storage. In another embodiment, a generic content application is not stored in any persistent storage of a particular mobile device, and instead that mobile device accesses the generic content application through a communication method (e.g., accessing an application hosted on a network resource, or accessing a non-hosted application stored on a remote file system, or in a cloud-based system).

Each of the shown mobile devices 150, 160 uses a native shell service 151, 161. The platform A mobile device 150 uses a platform A native shell service 151, while the platform B mobile device 160 uses a platform B native shell service 161. In the present embodiment, a native shell service includes software designed for use in running other software. For example, a native shell service may be used in connection with a content application in order to execute the content described within the content application. This could be accomplished using a native shell service which includes non-content software, such as binary files compiled from source code written in a programming language, examples of which include Java, C#, and C++. In this example, a mobile device may only be capable of executing binary files, as content files may be treated as purely descriptive data rather than executable commands. Binary files associated with a native shell service may be executed on the mobile device, and those binary files may be used to access one or more content files and perform actions based on the content stored within the one or more content files. The native shell service may thereby allow a developer to create a mobile application without needing to create any binary files associated with the mobile application—the application's behavior may be described within one or more content files, and that behavior is performed when a mobile shell accesses the content files and interprets their contents as corresponding to particular actions. A native shell service may use a functional library in order to look up what functional action or actions correspond to a particular content.

In the example of FIG. 1, distinct native shell services and corresponding distinct functional libraries are used in order to provide platform-specific functionality for generic content applications 101. A content application may be generic in that its content is not limited to use on a particular platform. However, a developer may wish to certain functionality within the generic content application that requires a platform-specific action to occur. For example, mobile devices using a variety of mobile platforms include gyroscope hardware and associated software which may be accessible to mobile applications running on those devices (e.g., so that a mobile game application can accept a user's physical movement of the mobile device as an input control for the game). At least some of the mobile platforms may require that a mobile application uses distinct, platform-specific functionality in order to make use of the gyroscope. A platform-specific mobile application could include functionality, such as gyroscope access, that is specific to one or more mobile platforms. A generic mobile application could provide the same gyroscope access, but described in a manner not specific to any particular mobile platform. The gyroscope access could instead be described using a generic placeholder which is translated to platform-specific functionality later, such as when a platform-specific native shell service 151 runs the generic content application 101 by using a platform-specific functional library 153 to determine what platform-specific gyroscope functionality will be performed in order to provide the gyroscope access which has been described generically in the generic content application 101.

Accordingly, the platform A shell service 151 may access a generic content application 101 and use a platform A functional library 153 in order to perform the functionality generically referenced within the generic content application 101 in a manner specific to platform A. Similarly, the platform B shell service 161 may access a copy of the same generic content application 101 and use a platform B functional library 163 in order to perform the functionality generically referenced within the generic content application 101 in a manner specific to platform B.

In one embodiment, the network application system 120 provides one or more native shell services and/or associated functional libraries, such as platform-specific native shell services 151, 161 and platform-specific functional libraries 153, 163 to mobile devices 150, 160. In another embodiment, no network application system 120 is used and a developer or some other entity may provide a mobile device 150 with a native shell service 151 and/or a functional library. For example, a platform-specific native shell service 151 and platform-specific functional library 153 could be included by the mobile device's manufacturer and immediately available to the user upon receiving the mobile device 151.

In some embodiments, one or more functional libraries 153, 163 are periodically updated in order to provide support for additional mobile device resource references. A generic device resource tag library 103 could be updated at a similar time in order to inform developers of these new mobile device resource references. In one embodiment, the system includes compatibility functionality so that a native shell will only run a generic content application if the native shell and/or its associated functional library are compatible with the generic content application. For example, the native shell may detect that a generic content application uses device resource tags which the native shell and/or the functional library does not support. In another embodiment, the network application system 100 provides at least some of this compatibility functionality.

Content Application and Functional Library

Referring to FIG. 2, a portion of an example generic content application 101 is shown along with corresponding portions of example platform-specific functional libraries 153, 163. The illustrated portion of the generic content application 101 relates to the use of a mobile device's camera. The generic content application may include other portions before 210 and after 218 the portion discussed here, and those other portions may include other mobile device resource references. The generic content application 101 includes text relating to the message "Let's take a picture!" 211. In the present example, this portion of the content may be understood by any mobile device with a platform or other software capable of supporting the standard in which the generic content application 101 is written, such as HTML5. The generic content application 101 next includes a button tag 212 identifying a user interface button element which will be displayed when using this portion of the generic content application. The button tag 212 indicates that the button's title will be "Camera" 213 and that, when a user presses the button, the portion of the content placed between the open button tag 212 and the close button tag 217 will occur in response.

The illustrated generic content application 101 uses a generic tag 214 to indicate a portion of its content which relates to generic functionality, such as mobile device resource references which may be resolved by a native shell to provide platform-specific functionality. The native shell may perform a request for a mobile device resource in response to encountering a reference to that mobile device resource. The open generic tag 214 indicates the beginning of a generic section and the close generic tag 216 indicates the close of a generic section. In another embodiment, open and close tags are not used to indicate sections of a generic content application 101 which relate to generic functionality. For example, a mobile device resource reference may occur at any point in the generic content application. A native shell may then identify mobile device resource reference based on one or more other factors, such as the name of a tag or variable, or syntax use.

The generic content application 101 of FIG. 2. includes a mobile device resource reference for access to a mobile device's camera 214. For example, the developer may have referenced a generic device resource tag library and identified the "<showCamera>" tag 215 as a means of displaying the camera interface of the mobile device using the generic content application.

The functional libraries 153, 163 include portions which relate to this showCamera tag. The platform A functional library is shown as including text data which lists the showCamera mobile device resource reference 230 and the associated functionality 231, 232 for providing access to the camera on a mobile device using platform A. For example, the platform-specific functionality may include software designed for the particular platform 232. The platform A functional library 153 associates three lines of software source code 232 with the showCamera function 230. In another embodiment, a functional library includes compiled, binary software which is associated with a function such as a mobile device resource reference. In still other embodiments, a functional library may associate a function such as a mobile device resource reference with one or more scripts, other applications, messages, assembly software, compiled software, source code software, and/or any combination thereof.

One piece of software may depend on other pieces of software to operate. Accordingly, a platform function library may include information indicating the dependencies 231 for a particular platform-specific implementation of a generic device resource reference. The platform A functional library indicates that the software used in connection with showCamera on platform A depends on two other pieces of software, "android.app.Activity" and "android.os.Bundle" 231. In another embodiment, software dependencies are not listed or are listed in a different format and/or location within a functional library.

The platform B functional library 163 also includes a portion relating to the showCamera function 250. This portion of the platform B functional library 163 provides the platform-B specific functionality 251, 252 for providing access to the camera on a mobile device using platform B. This includes software 252 and information concerning that software's dependencies 251.

In another embodiment, a functional library may indicate that the mobile platform which the functional library corresponds to does not support a particular mobile device resource reference. For example, a particular platform might not include or support camera hardware and/or related software. The functional library may include substitute functionality associated with an unsupported mobile device resource reference. For example, the substitute functionality could cause a message to be displayed to the user that the application is attempting to access a mobile device resource that is unsupported on the present mobile platform. Alternatively or additionally, the functional library may provide functionality meant to mimic that which would be provided by the mobile device resource. For example, a functional library could cause an image to be transmitted from the mobile device's file system rather than a camera. In another embodiment, a functional library may provide substitute functionality for a mobile device resource reference even the corresponding mobile platform supports the mobile device resource reference.

Cross-Platform Use

Figure 3:
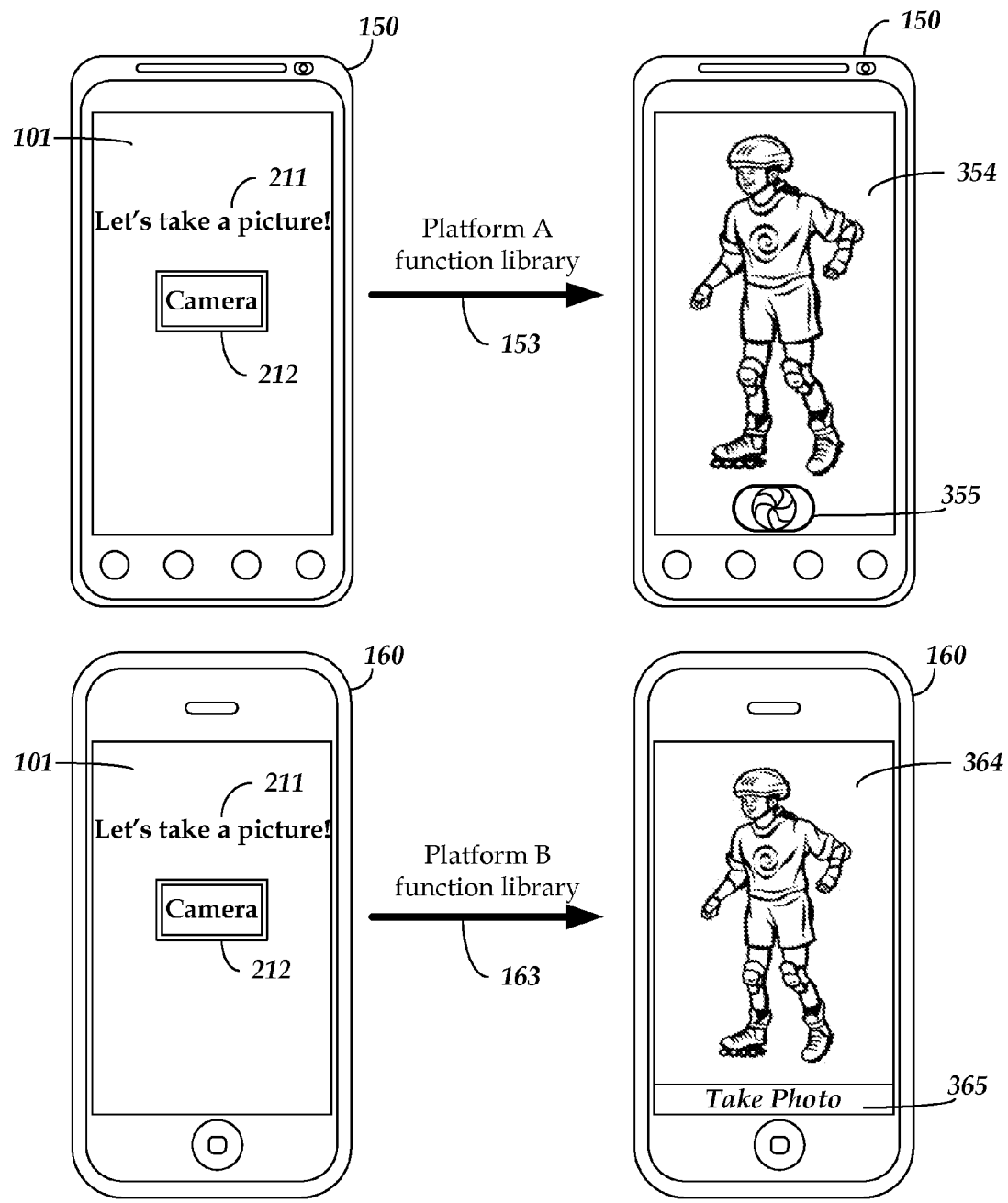
FIG. 3 is an illustration of the use of a cross-platform mobile application on two mobile devices with different platforms.

Referring to FIG. 3, example user interfaces are shown corresponding to the use of the generic content application 101 and functional libraries 153, 163 which were also described in the context of FIG. 2. The platform A mobile device 150 is shown using the generic content application 101 and displaying the "Let's take a picture!" message 211 contained therein. Also displayed on the platform A mobile device's 150 user interface is the "Camera" button 212 from the generic content application 101. In response to the user pressing the "Camera" button 212, the platform A functional library is accessed 153 in order to provide platform-A specific functionality associated with the showCamera mobile device resource reference, which was triggered by the user pressing the "Camera" button 212. For example, a platform A native shell service may have encountered the <showCamera> generic device resource tag and associated that tag with a generic mobile device resource reference which resulted in a mobile device resource request for the device's camera. The mobile device resource request may have been resolved using the platform A functional library in order to provide access to the mobile device's 150 camera. In the present embodiment, providing access to the mobile device's 150 camera in the context of platform A involves presenting an image-capture user-interface 354 which displays the current image being captured by the mobile device's 150 camera and includes a shutter-shaped button 355 which allows the user to take a picture with the platform A mobile device's 150 camera.

The present embodiment also illustrates the user of the generic content application 101 on a platform B mobile device 160. The same text 211 and button 212 are shown on the platform B mobile device's display. However, when the button 212 is pressed, it results in the platform B function library 163 being used in order to provide platform B-specific functionality for accessing the mobile device's 160 camera. Here, a different image-capture user interface 364 is shown. The platform B camera interface also displays the current image being captured by the mobile device's 160 camera. The platform B interface includes a button 365 titled "Take Photo" which allows the user to take a picture with the platform B mobile device's 160 camera.

Validation Service

Figure 4:
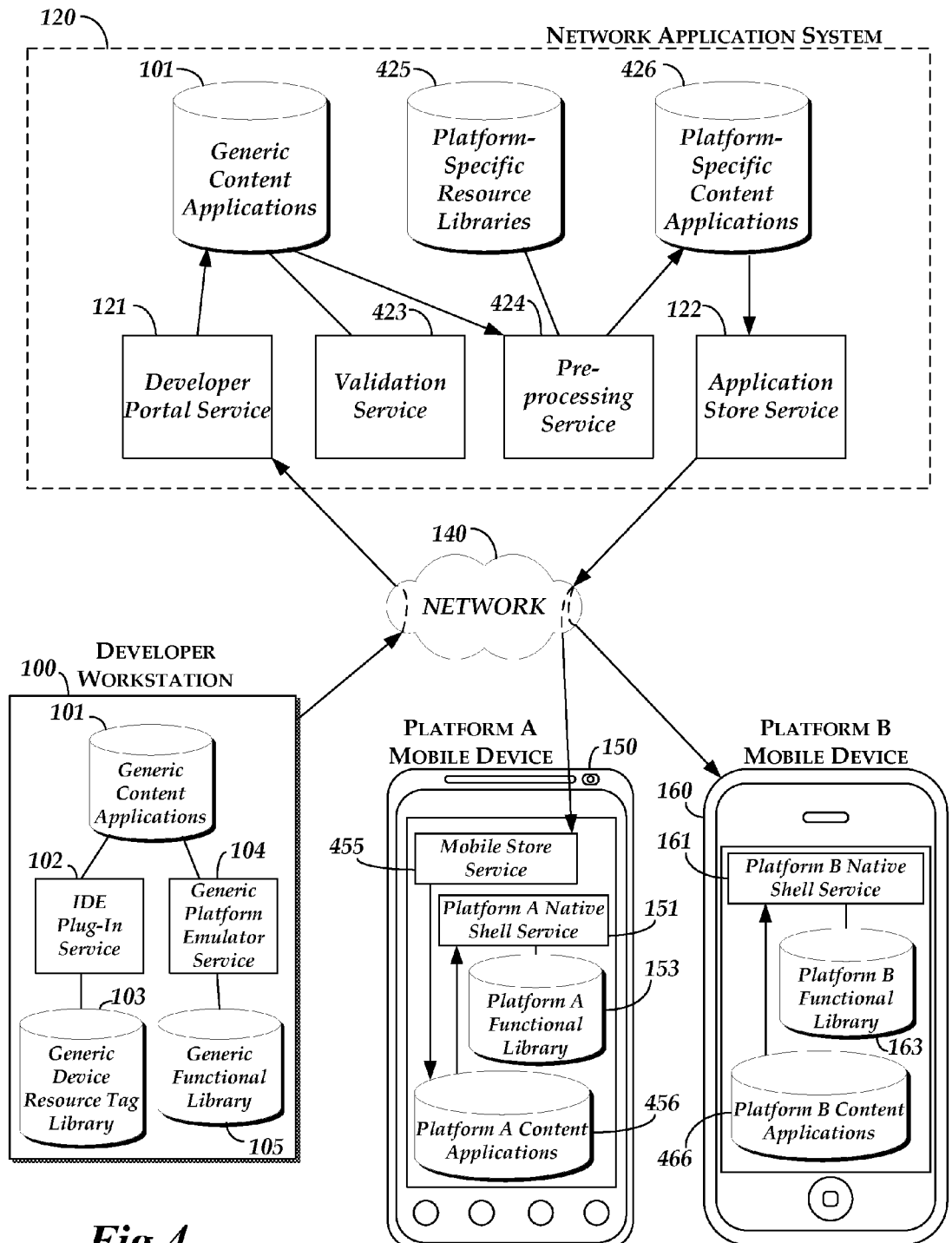
FIG. 4 depicts another embodiment of a system for the distribution of cross-platform mobile applications, this system including a validation service, a pre-processing service, and a mobile store service.

Referring to FIG. 4, another embodiment of a system for distributing cross-platform mobile applications is shown. The present embodiment includes a validation service 423 which accesses the generic content applications 101 stored on the network application system 120, and determines whether those generic content applications 101 meet certain recommended or required guidelines. For example, the validation service 423 may check the formatting of a generic content application 101 for errors which may cause the generic content application 101 to function improperly when used on a mobile device. Alternatively or additionally, the validation service 423 may determine whether the generic content application 101 includes proper use of generic tags, such as ensuring that each open generic tag is proceeded by a close generic tag, and whether the content within open and close generic tags are supported generic device resource tags.

In some embodiments, the validation service is triggered in response to the network application system 120 receiving a generic content application 101. The validation service 423 may record data indicating which generic content applications 101 have and have not been validated. The network application system 120 may notify a developer when it has been determined that the developer's generic content application 101 was identified as invalid. The validation service may also detect which version of generic device resource tags a particular generic content application 101 uses, and may record this information.

Pre-Processing Service

The present embodiment includes a pre-processing service 424 which performs certain platform-specific modifications on generic content applications 101 in order to generate platform-specific content applications 426. For example, a generic content application may include a mobile device resource reference to a virtual keyboard, by including the <showVirtualKeyboard> generic device resource tag. While a platform A mobile device 150 may be able to provide a virtual keyboard promptly when requested to do so, a platform B mobile device 160 may require certain preconditions to be met in order for the request associated from the reference to be promptly satisfied. The pre-processing service may access information concerning platform-specific content pre-processing in a data store for platform-specific resource libraries. The platform-specific resource libraries may indicate, for example, that a virtual keyboard reference should be pre-processed in order to create a platform B-specific content application. During pre-processing, the pre-processing service 424 may identify the virtual keyboard reference and may include content in the platform B-specific version of the content application which initializes the virtual keyboard well enough in advance of it being used. By creating platform-specific content applications 426, the pre-processing service may accomplish a variety of other tasks. A developer may thereby create a single, generic version of a content application and rely on the network application system 120 to create platform-specific versions.

Mobile Store Service

The embodiment system of FIG. 4 includes a mobile store service 455 stored on the platform a mobile device 150. The mobile store service 455 provides one means of obtaining content applications, including generic content applications 101 and platform-specific content applications 426 from the network application system 120. For example, the mobile store service 455 may be a mobile application running on the mobile device 150 which communicates with the network application system 120. Alternatively or additionally, the mobile store service 455 may perform one or more other tasks, including obtaining and updating a native shell 151 and/or functional library 153 on the mobile device 150.

Incorporation Service

Figure 5:
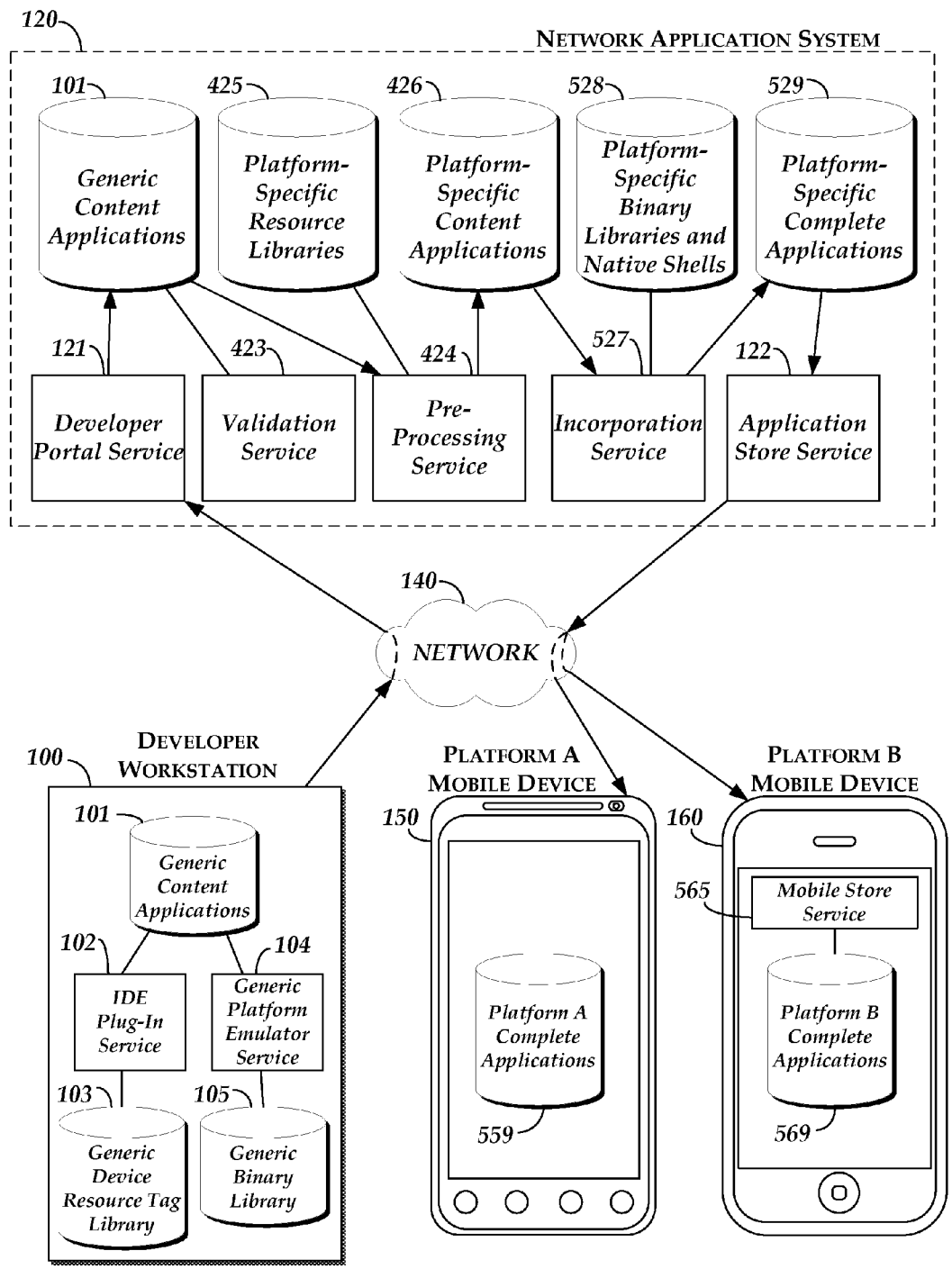
FIG. 5 depicts a third embodiment of a system for the distribution of cross-platform mobile applications, this system including an incorporation service and the use of complete, platform-specific applications on mobile devices.

Referring to FIG. 5, another embodiment of a system for distributing cross-platform mobile applications is shown. The present embodiment also enables developers to submit generic content applications 101 which include mobile device resource references that correspond to platform-specific functional implementations. However, in the present embodiment, mobile devices are provided with platform-specific complete applications rather than generic content applications or platform-specific content applications. The network application system 120 includes an incorporation service 527 in communication with platform-specific binary libraries and native shells 528.

The incorporation service uses the platform-specific binary libraries and native shells 528 to create platform-specific complete applications 529. For example, the incorporation service 527 may read through a generic content application or platform-specific content application and identify generic mobile device resource references. The incorporation service creates a platform A-specific complete application which replaces generic portions of the generic content application 101 with platform-A specific functionality. As explained when describing the various types of platform-specific functionality which may be used in response to a generic tag for a mobile device resource reference, such platform-specific functionality may be associated with compiled, binary software, a script, source code, etc. The incorporation service may then include one or more platform-A specific binary files, such as binary files used in a platform A native shell, in order to create a completed application which can be run natively on platform A and which includes the functionality described in the generic content application 101.

The network application system 120 may store a number of platform-specific complete applications 529, for example for different applications and/or different platforms. The network application system may provide complete applications to mobile devices 150, 160. For example, a mobile store service 565 may access an application store service 122 in order to obtain complete applications specific to the platform on which the mobile store service 565 is running. In the illustrated embodiment, the platform A mobile device 150 stores platform A complete applications 559 while the platform B mobile device stores platform B mobile applications 569.

In another embodiment, one or more mobile devices may be provided with a combination of one or more of generic content applications, platform-specific content applications, and platform-specific complete applications. In another embodiment, incorporation is performed at a location or by a system other than the network application system. For example, incorporation may occur on the developer workstation 100 or on the mobile device 150.

Network Resource Reference

Figure 6:
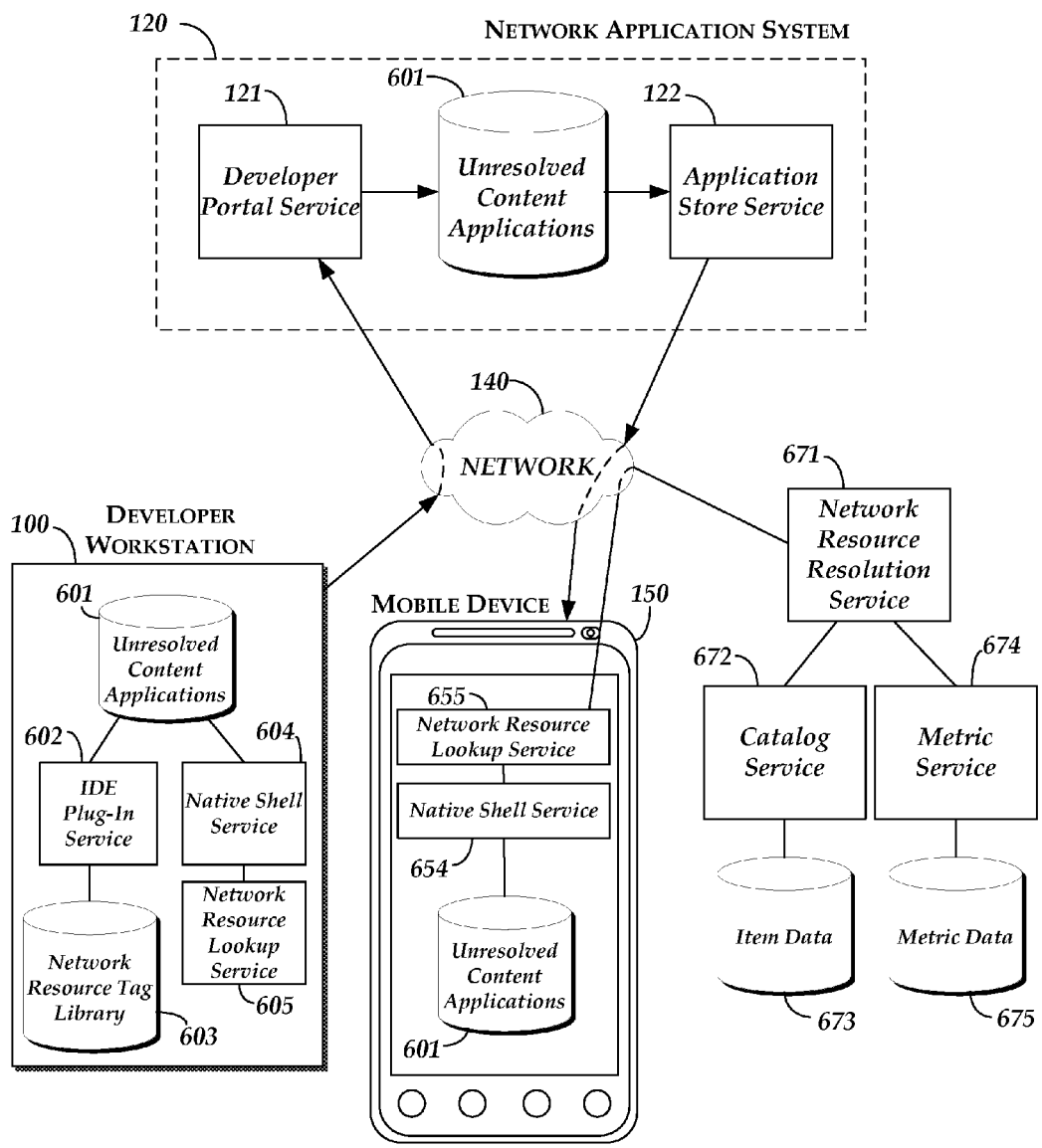
FIG. 6 depicts an embodiment of a system for distributing mobile applications capable of accessing network resources using a network resource lookup service.

FIG. 6 shows an embodiment of a system for distributing mobile applications which include unresolved references for network resources. Network resources may be any of a wide variety of resources which a mobile device 150 may access via a network 140. The present embodiment allows a mobile application developer to place a network resource tag within a mobile application's content so that the mobile application will look up the network resource when the mobile application is run. A native shell 654 may be used on the mobile device, and the native shell may communicate with a network resource lookup service 605 in order to assist in resolving a network resource reference into access to the referenced network resource.

Examples of network resources include electronic catalogs and/or one or more items which they contain (it will be understood that the term "item" may refer to either an actual item such as a physical or electronic thing which may be purchased, or a digital representation of that thing, for example an entry within an electronic catalog or database for the thing). As another example, an advertisement referenced by and/or provided to the mobile device may be a network resource. As yet another example, one or more metrics may be a network resource. Examples of metrics include information concerning high-scores, in-game achievements and usage rates.

A mobile developer may create a mobile application which can be augmented with additional content, such as extra levels, playable characters, themes, backgrounds, templates, protocols, language support, tutorials, books, multimedia, challenges, digital items, and licenses. This additional content may be downloadable content which a user of the mobile application can download, after obtaining the mobile application in order to add the additional content to the mobile application. The mobile application's developer may wish to use a network-based publisher for making the mobile application and/or its additional content available to users. For example, the developer may not wish to maintain a network server to store and make available the additional content. Furthermore, the developer may wish to require a user to pay in order to obtain certain additional content. The developer may wish to avoid configuring and maintaining a payment processing system in order to make this additional content available.

In some embodiments, a developer may rely on an electronic catalog 672 service to provide the additional content to users. The electronic catalog service may be capable of transmitting data describing some or all additional content presently available through the electronic catalog for a particular mobile application. Such data describing items available in an electronic data is one example of a network resource available to a mobile device in the embodiment of FIG. 6. In order to obtain this network resource, a mobile device may include a network resource reference and/or make an associated network resource request. A network resource tag is one example of a network resource reference. When the mobile application is run, it may transmit a lookup request corresponding to the network resource reference. The response received in relation to the network resource reference may depend on external factors, such as the time at which the lookup associated with the network resource reference was performed. For example, the contents of an electronic catalog may change over time and the same network resource reference may result in different responses when lookups are performed at different times. A network resource reference may be considered to be unresolved when it is stored within a content application and may result in different responses when performed at different times. By providing developers with the ability to include unresolved network resource references within unresolved content applications, the present embodiment may provide flexible, easily implemented means for accessing network resources.

The developer workstation 100 used in the present embodiment may include elements related to network resource references. For example, the developer may be developing an unresolved content application 601 which includes one or more unresolved network resource references. These network resource references may be represented within the mobile application in the form of network resource tags. The developer may refer to a network resource tag library 603 in order to gain information concerning the network resource tags, in a manner similar to a developer's use of a generic device resource tag library. The developer may also use an IDE plug-in service 602 that interacts with the network resource tag library in a similar manner to the way in which an IDE plug-in service interacts with a generic device resource tag library. In order to test and develop the unresolved content applications 601, the developer workstation 100 may include a native shell service 604 and a network resource lookup service 605. These services may behave similarly to the native shell service 654 and associated network resource service 655 discussed in the context of the mobile device 150 described below. In another embodiment, for example, the same native shell service 604 and/or the same network resource lookup service 605 may be used by or on the developer workstation 100 as the native shell service 654 and network resource lookup service 655 used by or on the mobile device 150.

The developer workstation 100 may interact with the network application system 120, for example in a manner similar to that described in the context of submitting generic content applications. In the present embodiment, the developer may submit unresolved content applications 601. The mobile device 150 shown may obtain one or more unresolved content applications 601, for example from the network application system 120. The mobile device 150 includes a native shell service 654. For example, the native shell service 654 may be software which can run an unresolved content application 601 and recognize an unresolved network resource reference within that unresolved content application 601. In one embodiment, this is performed in a manner similar to the way in which a platform-specific native shell service has been described as running generic content applications. However, in the present embodiment the native shell service 654 need not be platform-specific. For example, the native shell service 654 may be capable of providing access to network resources in a manner which spans multiple platforms and is not created for any platform specifically. In another embodiment, the native shell service 654 is platform-specific may therefore be a platform-specific native shell service.

The native shell service 604 may, in response to identifying a network resource reference within an unresolved content application 601, use a network resource lookup service in order to locate and/or access the desired network resource. For example, the network resource lookup service 655 may be software stored on the mobile device 150 which interacts with a network resource resolution service in order to identify the location of the referenced network resource and report that location to the native shell service 654. In such an embodiment, the native shell service 654 may then request the network resource directly. In another embodiment, the native shell service 654 interacts with the network resource lookup service 655 in order to obtain the network resource through the network resource lookup service 655. In another embodiment, the network resource lookup service 655 is not stored on the mobile device 150 but is in communication with the developer workstation 100.

Network Resource Lookup Service and Network Resource Resolution Service

The present embodiment includes a network resource resolution service 671 which is in communication with the network resource lookup service 655 through the network 140. In this example, the network resource resolution service 671 acts as a directory for network resources. The network resource resolution service 671 may have access to information identifying one or more network resources 672, 674 which may be used to satisfy a network resource reference. In one embodiment, the network resource resolution service 671 forwards a communication received from a mobile device 150 to a network resource 672 so that the network resource can respond to the mobile device 150 through the network resource resolution service 671. In another service, the network resource resolution service 671 provides the mobile device 150 with information concerning the network resource, thereby resolving the network resource reference and enabling the mobile application being performed on the mobile device 150 to access the desired network resource.

A catalog service 672 is shown in communication with item data 673. As has been described, such a catalog service 672 may provide information concerning the contents of an electronic catalog. This information may be stored as item data 673. The catalog service and/or the information which it provides may be a network resource. Examples of items which may be available through an electronic catalog service include digital items associated with a mobile device, for example extra levels, playable characters, themes, backgrounds, templates, protocols, language support, tutorials, books, multimedia, challenges, digital items, and licenses. These digital items, and/or information concerning them, are examples of network resources. A request for the five most popular themes for a particular mobile application is an example of a network resource request. Network resource requests and their associated references may additionally or alternatively relate to information concerning physical, non-digital items. For example, an electronic catalog may provide users with the ability to purchase shoes. A network resource reference may reference the price of a particular model of brown sneakers. Another network resource reference may reference information identifying whether the model of brown sneakers are currently in stock. A metric service 674 is also shown. The metric service may provide metric information, which it may obtain by communicating with a metric data store 675. Some examples of metric information has already been provided, but a variety of other examples also exist.

In one embodiment, the catalog service 672 is associated with the network application system 120 and may provide both the mobile application itself and additional content for the mobile application. For example, the network application system 120 may also be an electronic catalog and may include a catalog service 672 allowing a mobile application to request and obtain information concerning items offered through the electronic catalog. Network resource references may relate to actions other than requesting information. For example, a network resource reference may relate to the purchase of an item through an electronic catalog service. This network resource reference could be associated with an action, such as an access method, which submits information related to the purchase, for example to the catalog service 672. The mobile native shell service 654 may receive a response, for example from the catalog service 672 as a result of the purchase. For example, the native shell service 672 may be configured to download and/or install additional content which has been purchased for the mobile application and/or the mobile device 150.

Unresolved Content Application

Figure 7:
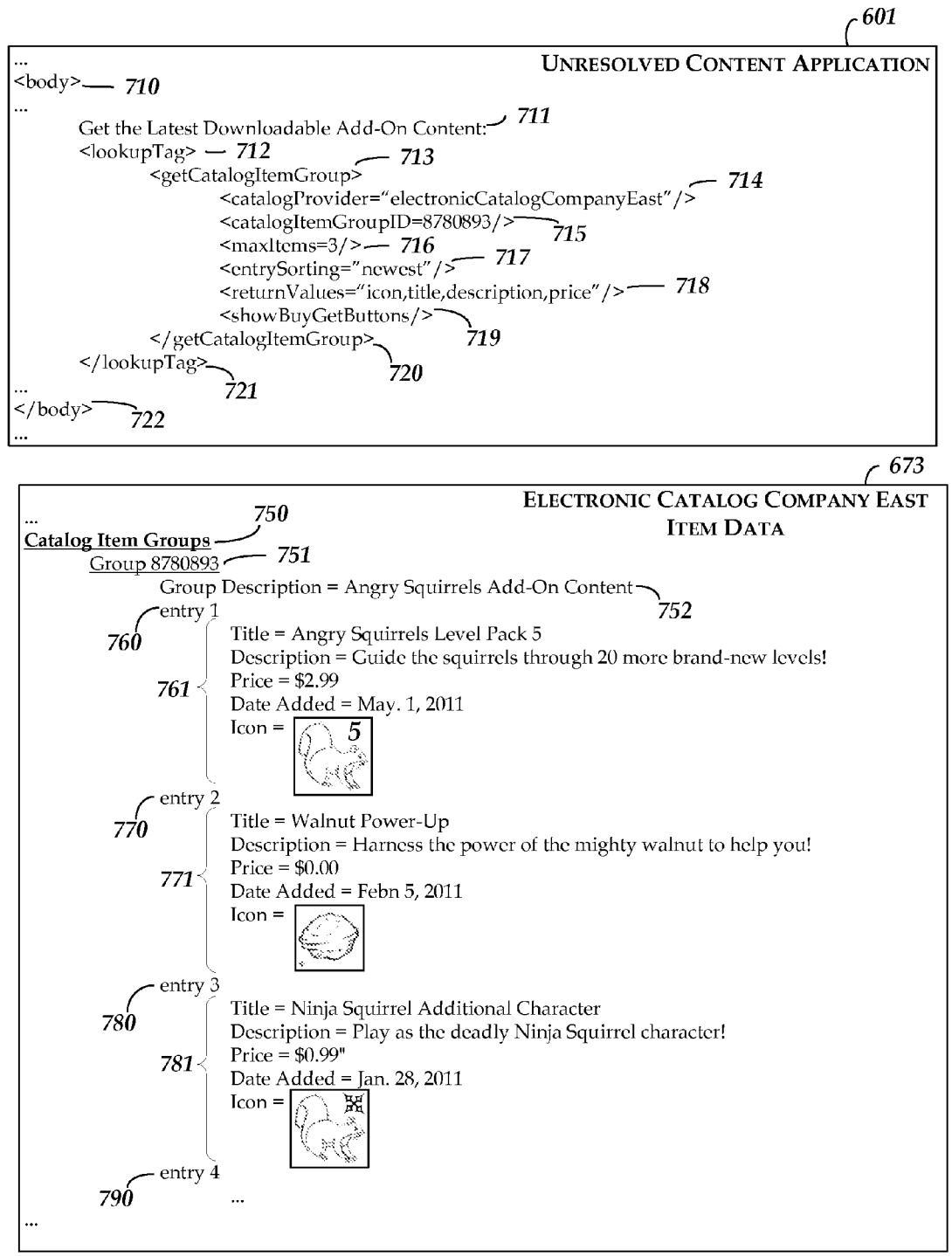
FIG. 7 is an example of a portion of an unresolved content application including network resource references, and an electronic catalog network resource corresponding to those network resource references.

Referring to FIG. 7, an example portion of an unresolved content application 601 is shown, along with a corresponding portion of data related to an electronic catalog 673. The unresolved content application 601 includes portions before 710 and after 722 the displayed section of content. The unresolved content application 601 includes a text-based description 711 which may be presented on a mobile device using the mobile application. The unresolved content application also includes an open lookup tag "<lookupTag>" 712 and a corresponding close lookup tag "</lookupTag>" 721. As was described in the context of generic content applications, such open and close tags may be used in certain embodiments to designate sections of an application. In unresolved content application embodiments, those sections may relate to network resource references to be resolved using a native shell service.

The embodiment of FIG. 7 includes a network resource reference which includes a number of sub-elements. The network resource reference is identified with a "<getCatalogItemGroup>" open tag 713 and a corresponding </getCatalogItemGroup>" close tag 720. The tags may appear within a network resource tag library which provides developers with a means of referencing available tags for network resource references. The network resource reference corresponds to a request for a catalog item group. The sub-elements 714-719 of the network resource reference 713 provide additional information concerning the reference. For example, the network resource reference is associated with a specific catalog provider, identified by the name "electronicCatalogCompanyEast" 714. This name may be used, for example, by a network resource lookup service and/or a network resource resolution service in order to determine what network resource will be used to provide the catalog item group requested. For example, a network resource resolution service may maintain a directory of network resource locations, such as catalog services, and may forward the associated network resource lookup to a network address associated with the Electronic Catalog Company East, or respond to the lookup with a network address associated with the Electronic Catalog Company East.

The network resource reference 713 also includes a catalog item group identification sub-element 715, identifying the reference as being for the item group with identification number 8780893. In the present example, that may be the number associated with the present mobile application. In another embodiment, a system does not require an identification number in order to present additional content for a mobile application because, for example, the mobile application itself and/or the native shell service running the application may provide information by which the application can be identified and its associated additional content can be determined. In still other embodiments, network resource references are associated with resources which are not related to a mobile device application.

The network resource reference 713 includes a sub-element identifying that the network resource reference is for a maximum of three items 716 from the identified item group 715. Another sub-element identifies that the items in the item group are to be sorted in the order of newest item first 717. The network reference of the present embodiment is thereby associated with a request seeking the three most recent items in item group 8780893 in Electronic Catalog Company East's electronic catalog. The network resource reference includes a "returnValue" sub-element 718 which identifies the pieces of information requested to be returned for each of the three most recent items. Those pieces of information are each item's icon, title, description and price 718. The network resource reference 714 also includes a sub-element identifying that buttons associated with buying and/or otherwise getting the returned items should be shown in the mobile application. These buttons may include embedded references and/or requests for additional network resources, such as a network resource reference to purchase a particular item from the electronic catalog.

FIG. 7 also depicts example contents of the electronic catalog maintained by Electronic Catalog Company East, for example in an item data store 673 associated with the electronic catalog. The item data is organized according to catalog item groups 750. Some of the contents of group 8780893 are shown. The group has a group description 752 and includes a number of entries 760, 770, 780, 790. Each entry includes a title, description, price, date added and an icon. These items may be stored, for example, as individual entries in a relational database, within a table, within a file-based storage system, or in some other storage format and/or medium.

Resolving a Network Resource Reference

Figure 8:
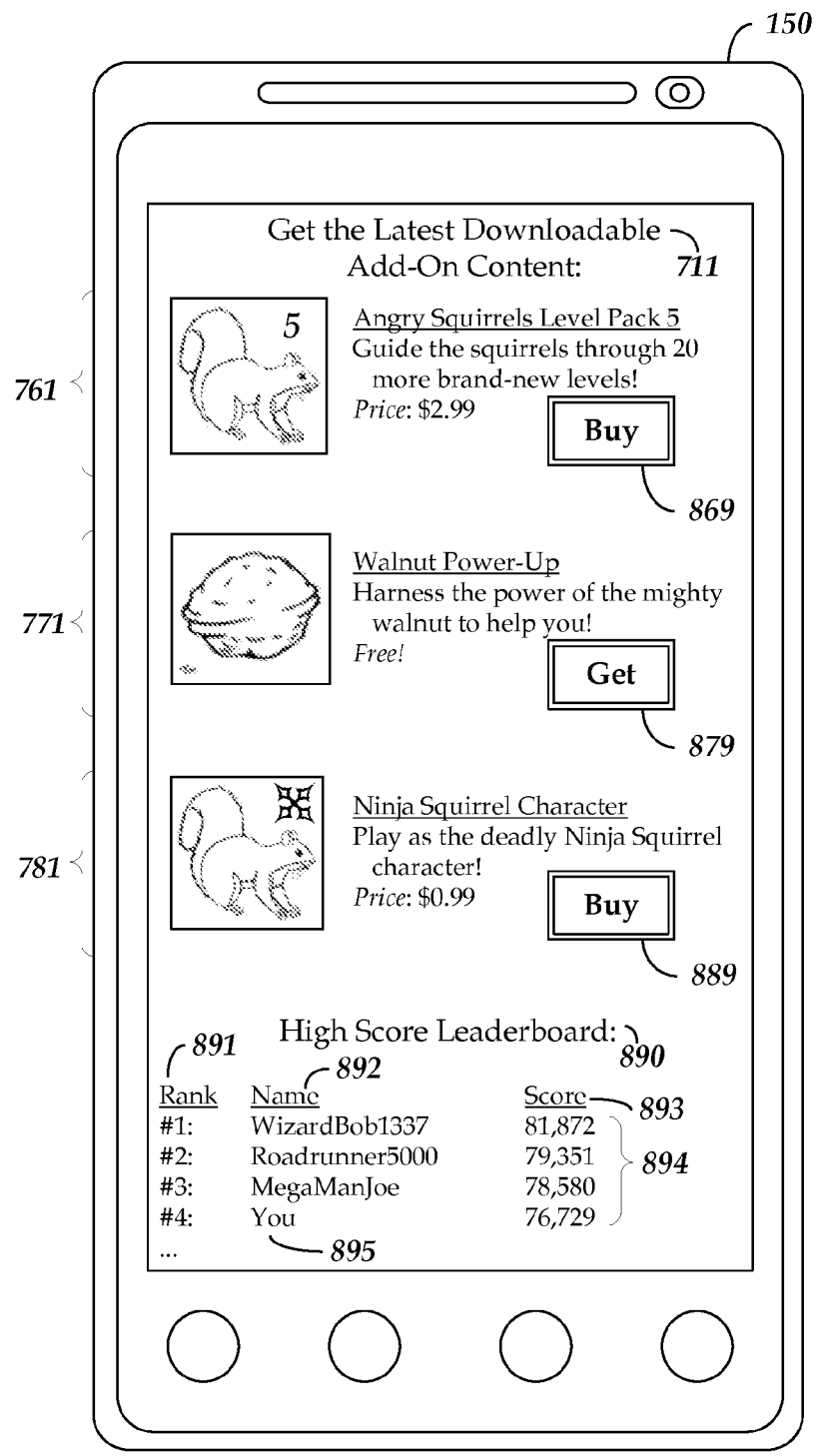
FIG. 8 illustrates an example user interface for a mobile application which includes mobile resource references.

Referring to FIG. 8, a user interface of a mobile device 150 running the content application described in FIG. 7, and other content from the same mobile application, is shown. The displayed user interface output is associated with the use of the content application after the unresolved network resource references discussed in the context of FIG. 7 have been resolved. For example, the network resource references were resolved using a network resource lookup service and a network resource resolution service in order to obtain network resources from the Electronic Catalog Company East's item data. The mobile device application includes the text description 711 included within its content. This text description did not require network resolution in order to present. The mobile device's display also shows user interface information showing item data associated with three items from the referenced item group of the electronic catalog. The icon, title, description and price for each of the three items 761, 771, 781 is shown. Also shown are buttons allowing the user to purchase 869, 889 or freely get 879 the items, based on the items' respective prices.

Below the section which corresponds to the network resource references of FIG. 7, the mobile application's user interface presents information related to other mobile device resource references. In this example, metric information is presents which was obtained by resolving network resource references for metric information accessible through a network. Here, the mobile application identifies the metric information as related to the values of a high score leaderboard 890. Headings identify high score entries by their rank 891, name 892 and score 893. The top four high score entries 894 are displayed. One of the entries 895 is identified by the mobile application as corresponding to the user of the mobile device 150. The metric information was obtained by resolving one or more network resource references associated with one or more metric resources, using a network resource lookup service, a network resource resolution service and a metric service.

Server-Side Network Resolution Lookup

Figure 9:
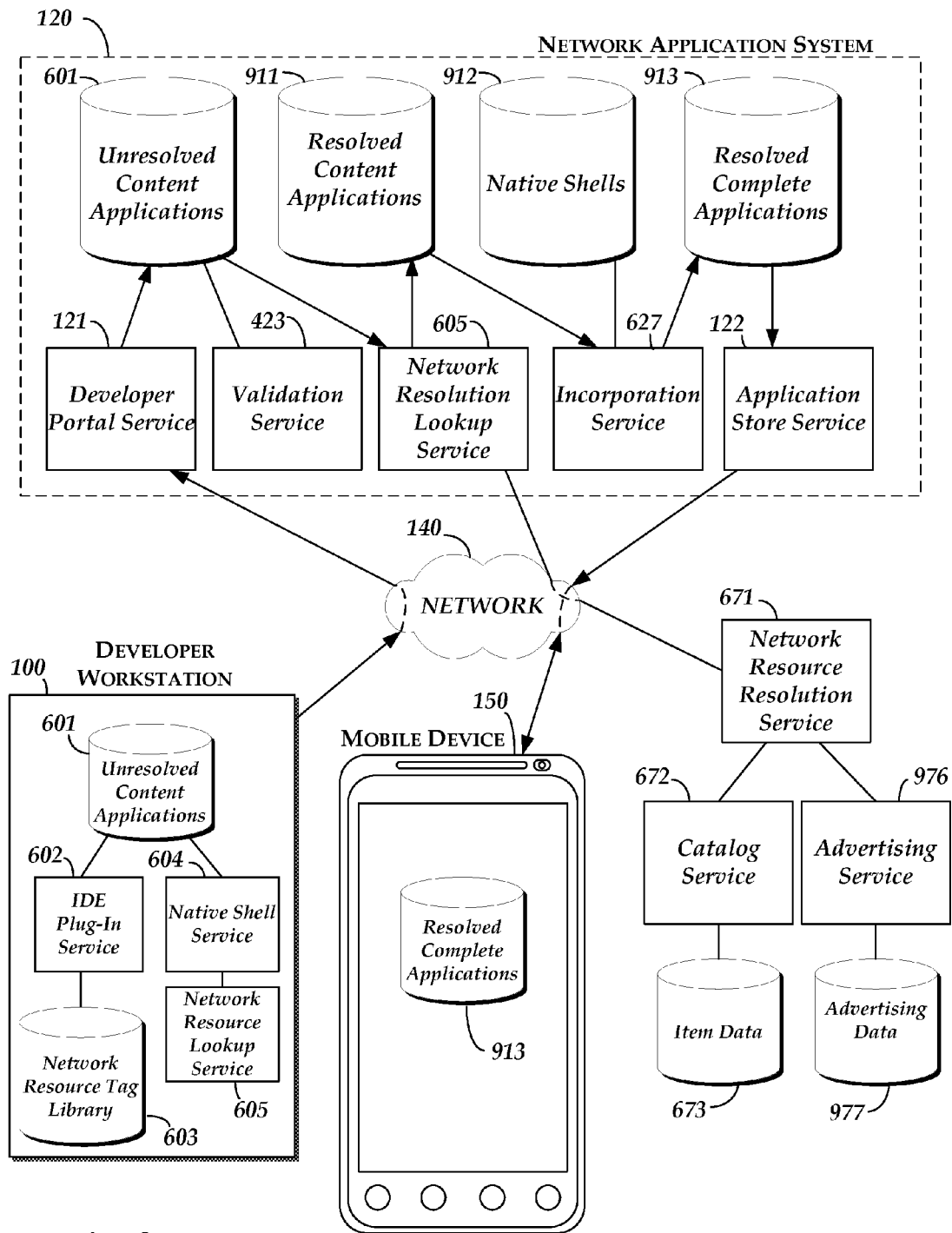
FIG. 9 depicts another embodiment of a system for distributing mobile applications capable of accessing network resources using a network resource lookup service, this system including an incorporation service and the use of resolved complete applications on a mobile device.

Referring to FIG. 9, another embodiment of a system for distributing applications capable of performing network resource requests associated with network resource references is shown. In the present embodiment, network resolution lookup occurs at the network application system 120 after an unresolved content application 601 has been submitted to the network application system 120 by a developer, but before a corresponding mobile application is made generally available to users' mobile devices 150. An unresolved content application 601 may be resolved into a resolved content application 911 using a network resolution lookup service 605 present on or accessible to the network application system 120. For example, the network resolution lookup service may function in a similar manner to the network resolution lookup services previously discussed for use on or with a mobile device 150 or developer workstation 100. In one embodiment, a developer may choose to have some or all of the network resource references within an unresolved content application 601 resolved at the network application system 120 rather than at a mobile device 150.

For example, a developer may wish to dedicate a portion of his mobile application's user interface to advertising. The present embodiment provides a convenient means for the developer to accomplish this—the network resource tag library 603 may include one or more network resource tags associated with advertising network resource references. The developer may select a "<80 pixelBy200 pixelBannerAd>" tag and include that tag within the mobile application's content. This tag corresponds to a network resource reference to a banner advertisement with display dimensions 80 pixels tall by 200 pixels wide.

The present embodiment provides intelligent advertising functionality as part of the network resolution lookup service 605 which occurs on the network application system 120. For example, the network application system 120 may scan the contents of the unresolved content application in order to identify the type of application. For example, the frequency of certain terms may be used to classify the application. Alternative or additionally, the developer may be asked to classify the mobile application when submitting it to the developer portal service 121. This classification may be used in part to classify the application within the application store service 122 so that it users can more easily locate desired applications. However, the network application system 120 may also use this classification system for improved intelligent advertising. The network resolution lookup service may resolve the advertisement portion of the application by replacing the banner advertisement tag with network resource-specific reference content for a banner advertisement from a specific advertising service 976 for a specific type of advertisement. The advertisement service may be in communication with advertising data 977, that advertising data describing different advertisements. The network application system 120 may store the resulting, resolved content application 911. In another embodiment, only some of the network resource references within an unresolved content application 601 are resolved at the network application system 120. In another embodiment, the resolved complete application 913 includes a resolved network resource reference and also receives dynamic advertisements while the resolved complete application 913 is running. For example, the resolved network resource reference for an advertisement may have been resolved to a type of advertisement-feed, or to software which performs regular and/or recurring requests for new advertisements from the advertising service 976, optionally based on an advertisement categorization which was determined by the network resolution lookup service 605.

Network Resource Reference Incorporation

The present embodiment includes an incorporation service 627 as part of the network application system 120. The incorporation service 627 may function in a manner similar to that described for incorporating platform-specific content applications in order to create platform-specific complete applications. The incorporation service 627 of the present embodiment accesses a data store with one or more native shells 912 in order to create resolved complete applications 913 in response to analyzing resolved content applications 911. For example, the incorporation service 627 may group a content application with one or more binary files capable of performing the actions described in the content application. The resulting version of the application may be considered a complete application because it can run without a separate shell service. The network application system may store complete applications, such as the resolved complete applications 913 of the present embodiment. In the present embodiment the incorporation service 627 does not rely on platform-specific native shells 912. Accordingly, the resulting resolved complete applications 913 are not platform-specific. In another embodiment, platform-specific native shells are used, resulting in platform-specific resolved complete applications.

Hosted Applications

Figure 10:
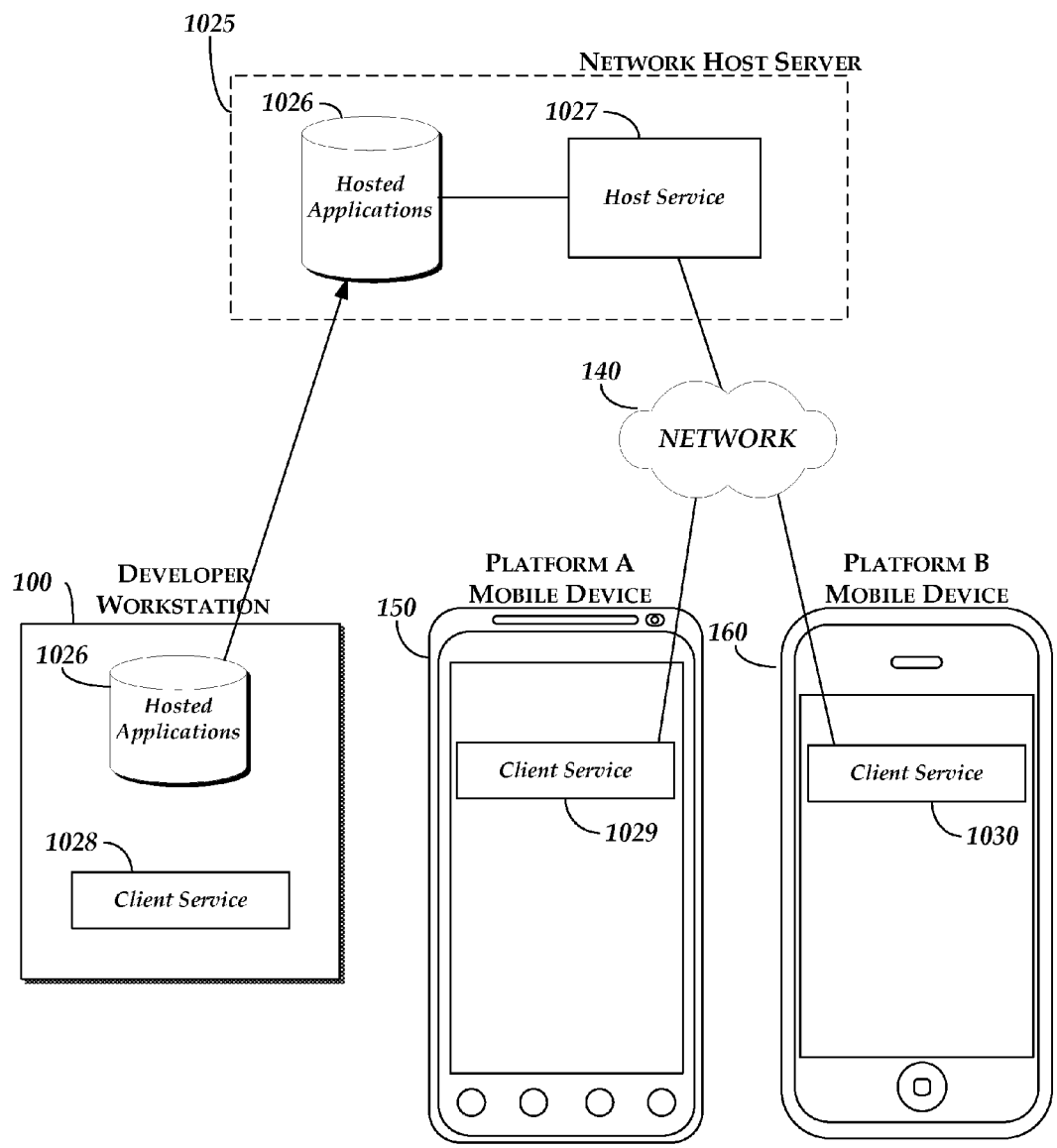
FIG. 10 depicts a prior art system for providing mobile devices with access to hosted applications on a network host server.

Referring to FIG. 10, a prior art system is shown. In this system, a developer creates a hosted application 1026 and transmits the hosted application to a network host server 1025. For example, the hosted application may be a web-based data entry application. A host service on the network host server 1025 provides users with access to the hosted application stored on the network host server 1025. The network host server includes a host service 1027 which allows users of mobile devices 150, 160 to access the hosted applications 1026 using a client service 1029, 130. For example, a user may use a web-browser application as a client service 1029 in order to access the hosted application 1026 which is accessible through the network 140 at a particular URL. The hosted application 1026 may interact with and depend on having access to certain host resources on the network host server.

Native Host Service

Figure 11:
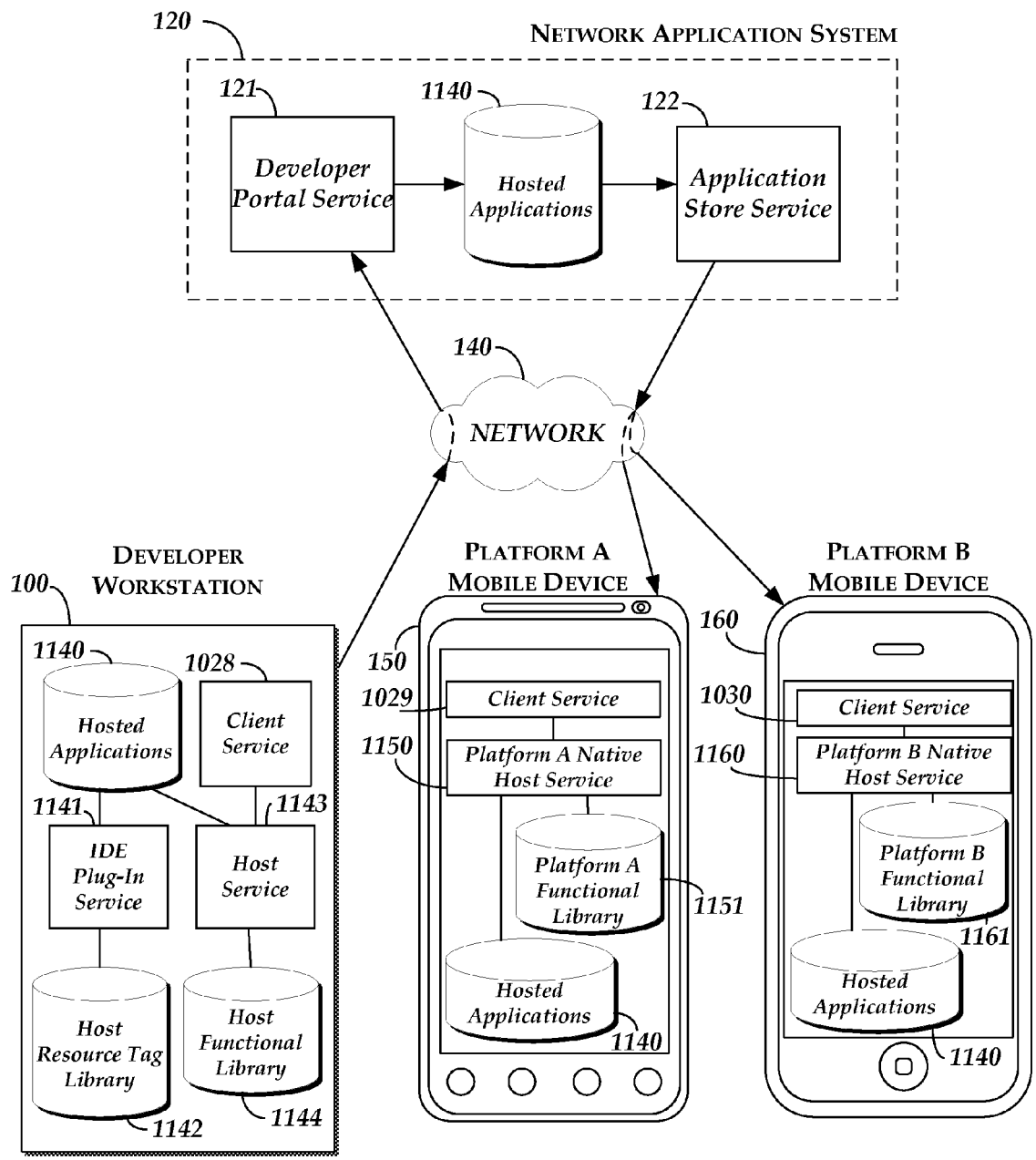
FIG. 11 depicts an embodiment of a system for distributing hosted applications for native use on mobile devices.

Referring to FIG. 11, there is illustrated an embodiment of a system capable of distributing hosted applications for native use on mobile devices. The hosted applications 1140 may include content-based references to host resources. Examples of host resources include host-based storage, message forwarding service, and a request/reply interface. A host resource reference may seek access to a database storage system present on or accessible to the host server upon which the hosted application is run. While providing users with network-based access to hosted applications running on network host servers provides certain advantages, these are accompanied by disadvantages. Accordingly, a developer may wish to create a hosted application but distribute the hosted application for native use on a mobile device 150, 160.

A developer may develop a hosted application 1140 by referencing a host resource tag library 1142 which lists content tags associated with certain, supported host resource references. The developer may run a host service 1143 on the developer workstation 100 in order to use and test the hosted application 1140 during development. For example, a host service 1143 such as Apache may be used on the developer workstation, and the developer may connect to the host service 1143 using a web browser client service 1028 such as Google's Chrome web-browser. The developer may submit the hosted application 1140 to a network application system 120, which makes the hosted application 1140 available for mobile device to be copied onto data storage of one or more mobile devices 150, 160. The network application system 120 may use an application store service in order to transmit the contents of the hosted application to a mobile device 150.

The mobile devices of the present embodiment include platform-specific native host services 1150, 1160 which are designed in order to run hosted applications 1140 natively on a mobile device. Platform A mobile device 150 includes platform a native host service 1150 which has access to hosted applications 1140 and a platform a functional library 1151. The platform A native host service 1150 may run the content of a hosted application 1140 and, in response to identifying a host resource reference, may interact with the platform A functional library 1151 in order to determine the appropriate functionality in the context of platform A in order to support the host resource reference. The platform A mobile device includes a client service 1029 which may communicate with the platform A native host service 1150 in order to access the hosted application 1140. From the user's perspective, the hosted application which is being run natively on the mobile device 150 may appear similar or indistinguishable to a hosted application running on a network host service.

The platform B mobile device 160 includes a platform B native host service 1160 which uses a platform B functional library 1161 in order to perform platform-B specific functionality in response to host resource references of one or more hosted applications 1140.

Hosted Application Content

Referring to FIG. 12, an example portion of a hosted application 1140 and the corresponding portion of a platform-specific functional library 1151 are shown. The hosted application's content indicates that it is a warehouse inventory hosted application 1201. The content includes a section of content corresponding to displaying information concerning blue widgets 1202. The application includes text corresponding to the characters "In Stock:", followed by an open host tag 1024. This example includes a number of short host tag sections, identified as occurring between an open host tag 1204 and a closed host tag 1206. For example, the first host tag section includes a host tag for the reference "serverGetDBEntry" 1205 which corresponds to a host resource reference to a request to get the value of a server's database entry. The host tag indicates that the particular resource reference seeks the database entry named "blueWidgetStock", corresponding to the inventory stock of blue widgets. The "On Order:" 1207 line of content includes a host resource reference to the number of blue widgets on order 1208. Next, the mobile application's content includes a button 1209 tag with title "Update Inventory" 1210. This corresponds to a button which, when pressed, performs a host resource reference 1211. The triggered host resource reference sets the value of the server database corresponding to the inventory of blue widgets 1211. Another button with the title "Order 10" is associated with the host resource reference to submit an order for ten additional blue widgets to the recipient WidgetCo. This order submission is a message type of host resource. The hosted application 1140 includes similar content for displaying, obtaining, and submitting information 1233 concerning orange widgets 1232.

The present embodiment also includes a platform A-specific functional library 1151 with functionality corresponding to performing satisfying certain host resource references in the context of running a hosted application on a mobile device with platform A. For example, serverGetDBEntry is a host resource reference 1263. The platform A functional library associates that host resource reference with platform-A specific functionality 1264 wherein a particular SQLiteDatabase object has a method performed in order to get an entry from a database running natively on the mobile device, for example as part of the platform A native host service. This functionality depends on a software object 1261 defined earlier in the functional library. The serverSetDBEntry 1265 depends on the same software object 1261 and returns a value indicating whether a platform-A specific database function was successful 1266. The serverForwardMessage host resource reference 1267 includes two parameters: the message to forward, and the recipient to forward the message to. The platform A functional library 1151 indicates that the serverForwardMessage host resource reference 1267 can be satisfied on a platform A mobile device using a QueuedMessageHandler software object 1262 by invoking that object's forwardMessage function 1268.

Native Use of Hosted Application

Figure 13:
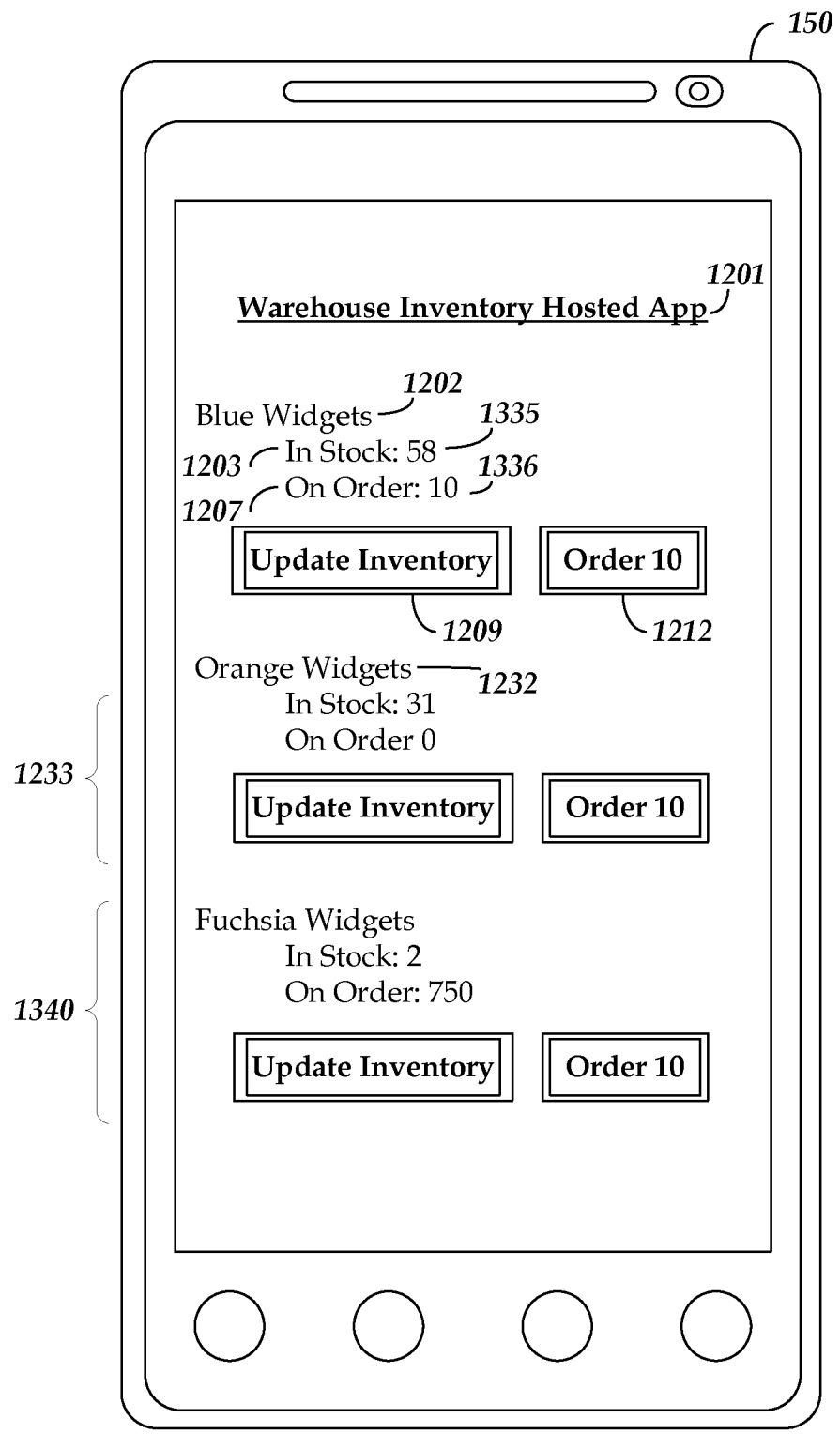
FIG. 13 illustrates an example user interface for a hosted application operating natively on a mobile device.

Referring to FIG. 13, a user interface embodiment is shown which corresponds to the hosted application and functional library discussed in the context of FIG. 12. The warehouse inventory hosted application 1201 presents information for blue widgets 1202, including the number presently in stock 1203 and the number on order 1207. The values shown are obtained by a host service which identifies the host references within the content of the mobile application and uses a functional library in order to determine the platform-specific functionality to use in satisfying those host resource references. The native host service and functional library thereby provide the hosted application with the sense of being run in a hosted environment even though it is actually being run natively on a mobile device. For example, the hosted application performed a host database lookup and determined that there are 58 widgets in stock 1135 and ten widgets on order 1336. The hosted application supports updating the inventory for widgets using a button 1209. Were the hosted application being run on a network host server, that button press may result in a host request that is satisfied directly by a host resource on the network host. However, when the hosted application is run on a mobile device, the button press may instead result in a mobile platform-specific functionality being used to substitute for the referenced host resource. Similarly, a platform-A specific messaging functionality may be used in connection with a host resource reference for a messaging service. That host resource reference is triggered whenever the blue widget's "Order 10" button 1212 is pressed. The mobile application presents user interface elements 1233 corresponding to the orange widget 1232 content from FIG. 12. Also shown is user interface information concerning fuchsia widget content 1340.

Conclusion

Although certain systems, methods and embodiments have been described related to distinct systems embodying use of generic mobile device resource references, unresolved network resource references, and host resource references, a system may use any combination of these types of resource references. For example, a library may provide information concerning one or more types of reference, a shell service may be able to identify one or more of types of reference, and an application may include one or more types of reference.

The network application system 120 may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state.

Each of the services, for example services 102, 104, 121, 122, 151 and 161 shown in FIG. 1, services 602, 604, 605, 121, 122, 655, 671, 672 and 674 shown in FIG. 6, and the services shown in FIGS. 4, 5, 9 and 11 may be implemented in an appropriate combination of computer hardware and software, or in application-specific circuitry. For example, each such service may be implemented in service code executed by one or more physical servers or other computing devices. The service code may be stored on non-transitory computer storage devices or media. The various data repositories 101, 105, 153, 163, 425, 426, 528, 529, 559, 569, 601, 603, 673, 675, 911, 912, 913, 1140, 1142, 1144, 1151 and 1161 may include persistent data storage devices (hard drives, solid state memory, etc.) that store the disclosed data, and may include associated code for managing such data.

Although the inventions have been described in terms of certain preferred embodiments, other embodiments will be apparent to those of ordinary skilled in the art, including embodiments that do not include all of the features and benefits set forth herein. Accordingly, the invention is defined only by the appended claims. Any manner of software designs, architectures or programming languages can be used in order to implement embodiments of the invention. Components of the invention may be implemented in distributed, cloud-based, and/or web-based manners.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

What is claimed is:

1. A method for natively using a hosted application, structured for a network host environment, on a mobile device, the method comprising:
    storing the host application on the mobile device, wherein said host application comprises a network host resource reference, wherein the network host resource reference identifies a network host resource available from an exterior host server, and wherein the network host resource comprises a programmatic, non-graphical interface provided by the exterior host server;
    storing on the mobile device a native host service configured to identify the network host resource reference and translate the network host resource reference to a mobile device resource request wherein the mobile device resource request utilizes one or more resources of the mobile device in place of the network host resource; and
    executing, using the native host service, computer-executable instructions of the host application on the mobile device, said computer-executable instructions comprising the network host resource reference, wherein executing the computer-executable instructions comprises translating the network host resource reference to the mobile device resource request and performing an access method for the one or more resources of the mobile device in place of the network host resource, independently of whether the mobile device has a present network connection.

2. The method of claim 1, wherein the network host resource is host-based storage and the one or more resources of the mobile device accessed by the mobile device resource request provide storage on the mobile device in place of host-based storage.

3. The method of claim 1, wherein the network host resource is a message forwarding service and the one or more resources of the mobile device accessed by the mobile device resource request provide a message forwarding service on the mobile device in place of a messaging forwarding service on an exterior service.

4. The method of claim 1, wherein the network host resource is a request/reply interface and the one or more resources of the mobile device accessed by the mobile device resource request receive a request within the mobile device rather than at an exterior service, and provide a reply within the mobile device rather than from an exterior service.

5. The method of claim 1, wherein a single application provides a conduit to a host-based storage host resource, a message forwarding host resource and a request and reply interface host resource, and wherein the resources of the mobile device accessed by the mobile device resource request: (1) provide storage on the mobile device in place of host-based storage; (2) provide a message forwarding service on the mobile device in place of a messaging forwarding service on an exterior service; and (3) receive a request within the mobile device rather than at an exterior service, and provide a reply within the mobile device rather than from an exterior service.

6. The method of claim 1 wherein said native host service is associated with a platform of the mobile device.

7. The method of claim 1 wherein the native host service is configured to communicate with a functional library in order to translate the host resource request to the mobile device resource request.

8. The method of claim 1 further comprising:
pre-processing the stored hosted application in order to generate a platform-specific hosted application based on the stored hosted application, wherein pre-processing comprises altering the content of the stored hosted application;
storing the platform-specific hosted application; and
providing the platform-specific hosted application to a mobile device having a platform to which the platform-specific hosted application relates.

9. The method of claim 1 wherein executing, using the native host service, computer-executable instructions of the host application on the mobile device comprises accessing a functional library which includes a relationship between the host resource request and the mobile device resource request.

10. A system for providing a hosted application for native use on a mobile device, the system comprising:
a generic host software development kit for use on a mobile application development station, said a generic host software development kit including a generic host resource tag library, said generic host resource tag library comprising information identifying a plurality of content-based references to network host resources;
a network application system comprising one or more physical servers configured to receive, from one or more mobile application development stations, mobile device applications, at least some of said mobile device applications having one or more content-based references to a network host resource, wherein said network application system comprises one or more physical servers, and wherein each content-based reference to a network host resource identifies, through application content, a network host resource available from an exterior host server, and wherein the network host resource comprises a programmatic, non-graphical interface provided by the exterior host server; and
a native host service for a mobile device, said native host service configured to operate on the mobile device in order to run mobile device applications, at least some of which include one or more content-based references to one or more network host resources;
wherein said native host service is configured to identify a content-based reference to a network host resource within the content of a mobile device application and, in response to identifying the content-based reference for the network host resource, perform an access method for one or more mobile resources provided by the native host service on the mobile device in place of performing an access method for the network host resource available from the exterior host server; wherein said content-based request for the mobile device resource is identified in said host resource tag library.

11. The system of claim 10, wherein the host resource is host-based storage and the one or more resources provided by the native host service on the mobile device provide storage on the mobile device in place of host-based storage.

12. The system of claim 10, wherein the host resource is a message forwarding service and the one or more resources provided by the native host service on the mobile device provide a message forwarding service on the mobile device in place of a messaging forwarding service on an exterior service.

13. The system of claim 10, wherein the host resource is a request and reply interface and the one or more resources provided by the native host service on the mobile device receive a request within the mobile device rather than at an exterior service, and provide a reply within the mobile device rather than from an exterior service.

14. The system of claim 10, wherein a single application provides a conduit to a host-based storage host resource, a message forwarding host resource and a request and reply interface host resource and wherein the resources provided by the native host service on the mobile device: (1) provide storage on the mobile device in place of host-based storage; (2) provide a message forwarding service on the mobile device in place of a messaging forwarding service on an exterior service; and (3) receive a request within the mobile device rather than at an exterior service, and provide a reply within the mobile device rather than from an exterior service.

15. The system of claim 10 wherein said native host service is associated with a platform of the mobile device.

16. A non-transitory computer-readable medium having computer-executable instructions for performing a method for accessing a network resource from a mobile device in response to a markup-based reference to the network resource, the markup-based reference contained within a mobile device application, the method comprising:
receiving, from the mobile application developer, a mobile device application with a content-based reference for a network host resource, wherein the content-based reference for a network host reference identifies a network host resource available from an exterior host server, and wherein the network host resource comprises a programmatic, non-graphical interface provided by the exterior host server;
storing the mobile device application;
providing the mobile device application to mobile device users; and
providing a native host service to a mobile device, wherein the native host service is configured to operate on the mobile device in order to run mobile device applications, at least some of which include one or more content-based requests to network host resources, by performing an access method for the host resource referenced by the reference, wherein said access method comprises accessing one or more mobile resources provided by the native host service on the mobile device in place of performing an access method for the network host resource available from the exterior host server.

17. The computer-readable medium of claim 16, wherein the network host resource is host-based storage and the one or more resources provided by the native host service on the mobile device provide storage on the mobile device in place of host-based storage.

18. The computer-readable medium of claim 16, wherein the network host resource is a message forwarding service and the one or more resources provided by the native host service on the mobile device provide a message forwarding service on the mobile device in place of a messaging forwarding service on an exterior service.

19. The computer-readable medium of claim 16, wherein the network host resource is a request and reply interface and the one or more resources provided by the native host service on the mobile device receive a request within the mobile device rather than at an exterior service, and provide a reply within the mobile device rather than from an exterior service.

20. The computer-readable medium of claim 16, wherein a single application provides a conduit to a host-based storage host resource, a message forwarding host resource and a request and reply interface host resource and wherein the resources provided by the native host service on the mobile device: (1) provide storage on the mobile device in place of host-based storage; (2) provide a message forwarding service on the mobile device in place of a messaging forwarding service on an exterior service; and (3) receive a request within the mobile device rather than at an exterior service, and provide a reply within the mobile device rather than from an exterior service.

21. The computer-readable medium of claim 16 wherein said native host service is associated with a platform of the mobile device.

\* \* \* \* \*